United States Patent [19]

Gehrke

[11] Patent Number: 4,726,349

[45] Date of Patent: Feb. 23, 1988

[54] PORTABLE GRILL DEVICE

[76] Inventor: Peter Gehrke, Ginsterweg 31, D 7742 St. Georgen/Brigach, BRD, Fed. Rep. of Germany

[21] Appl. No.: 852,991

[22] Filed: Apr. 17, 1986

[51] Int. Cl.⁴ .............................................. A47J 37/00
[52] U.S. Cl. ................................... 126/25 R; 126/9 R; 126/25 B; 126/145; 126/152 R
[58] Field of Search ...................... 126/9 R, 9 B, 25 R, 126/29, 30, 37 B, 39 K, 137

[56] References Cited

U.S. PATENT DOCUMENTS

| | | | |
|---|---|---|---|
| 963,922 | 7/1910 | McDaniels | 126/9 R |
| 1,153,610 | 9/1915 | Lamater | 126/9 R |
| 1,212,162 | 1/1917 | Green | 126/30 |
| 1,491,080 | 4/1924 | Clark | 126/9 R |
| 1,596,826 | 8/1926 | Gregory | 126/9 R |
| 2,119,799 | 6/1938 | Sivey | 126/9 R |
| 2,292,377 | 8/1942 | Howard | 126/152 R |
| 2,473,658 | 6/1949 | Milligan | 126/9 B |
| 2,511,594 | 6/1950 | Loffredo | 126/9 B |
| 2,608,190 | 8/1952 | Winning et al. | 126/9 R |
| 2,900,897 | 8/1959 | Fisher | 126/9 R X |
| 2,922,414 | 1/1960 | Brendor | 126/9 R |
| 2,959,165 | 11/1980 | Mark | 126/9 R |
| 3,154,065 | 10/1964 | Bencoe | 126/9 R X |
| 4,054,123 | 10/1977 | Carter | 126/137 |
| 4,592,334 | 6/1986 | Logan, Jr. | 126/25 B |

FOREIGN PATENT DOCUMENTS

| | | | |
|---|---|---|---|
| 26093 | 12/1897 | France | 126/145 |
| 51435 | 6/1942 | France | 126/145 |

Primary Examiner—Larry Jones
Attorney, Agent, or Firm—McGlew and Tuttle

[57] ABSTRACT

A portable grill device comprises a firebox which has a hexagonal plan form and six side walls and is made of sheet steel and of even height and is provided with at least three detachable legs, a vertically adjustable cooking grid and a pot-holder that pivots on a vertical axis. In the corners of each of the side walls inwardly bent lug sheets are arranged together which with the corner sections of the side walls form connector lugs open at the top and bottom and having a rhombic cross section. Into these connector lugs, rhombic connecting pegs of the legs can be inserted form-fittingly from the bottom side of the firebox, and from the top, either connecting pegs of wind-guard walls or additional legs can be inserted to form a girder-like kettle or grid hanging device, or pot-holders. Each of the legs comprise metal tubes at one end have a connecting peg with rhombic cross-section, bent by 30°. The mountable wind-guard walls are joined to each other in a hinge-like manner, with the hinge spindles at the same time forming connecting pegs.

16 Claims, 17 Drawing Figures

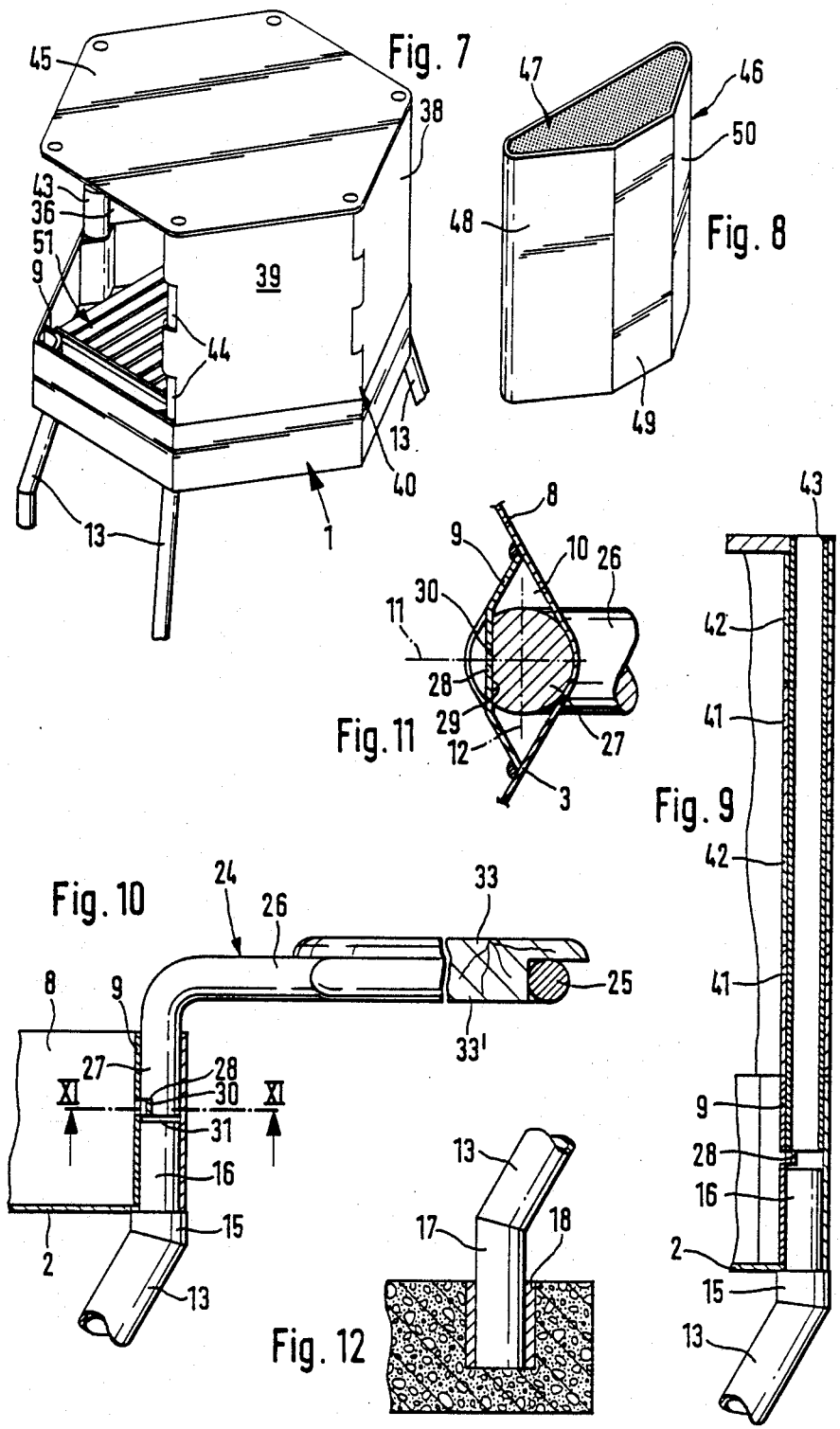

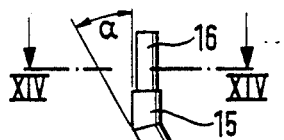
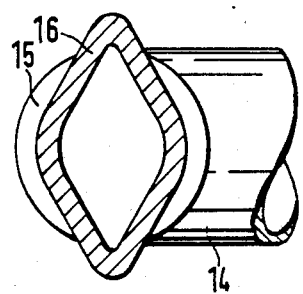
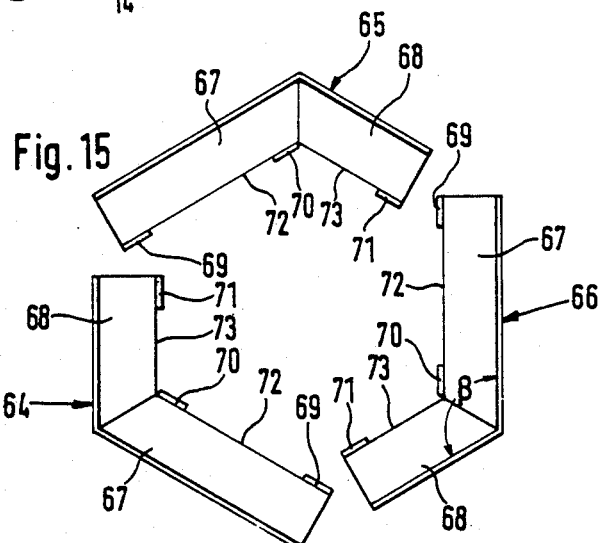
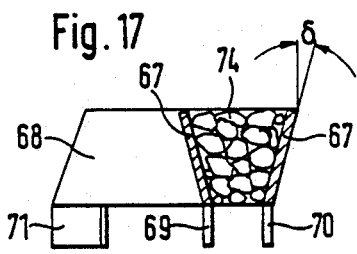
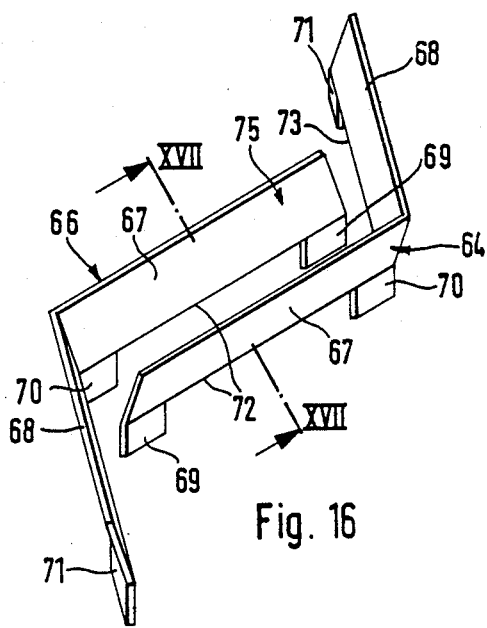

PORTABLE GRILL DEVICE

FIELD AND BACKGROUND OF THE INVENTION

This invention relates in general to the constuction of cooking devices and in particular to a new and useful portable grill.

The invention is concerned particularly with a portable grill device, composed of a firebox of sheet steel that has a hexagonal plan form and six side walls of even height, with at least three detachable legs with removable wind guards, with a cooking grid that can be hung vertically adjustable in a holding device above the bottom of the firebox, as well as with at least one brazier that is insertable in the firebox, and with at lest one pot-holder that pivots on a vertical axis and is removable.

In a known grill device (German OS No. 24 15 575), a rectangular firebox is provided, the bottom of which is formed by numerous grate bars running parallel to each other. This firebox can also be inserted in a rectangular ash box which has at least two heat-shield walls situated opposite one another. Each of these heat shield walls has a notch-like recess at its upper edge, in which handles of the firebox can be hung. A cooking grid an be attached above the firebox, at various height levels. In addition, on the outside of a long side wall of the firebox, a vertically running piece of pipe is attached, which serves to accommodate the vertical bar of a pot-holder which is provided with a horizontal annular loop and is also vertically adjustable.

In addition, a grill device is known (German IS No. 26 12 230) in which the firebox has a hexagonal form, and in which a fire grate is situated. The firebox is provided with three feet which are shaped as triangular sheet steel parts. On the upper edge of the firebox, a rectangular cooking grid can be placed, which is longer and narrower than the hexagonal form of the firebox. In addition, a chinmey-like flue can be placed on the upper edge of the firebox; it is made of stainless sheet steel, as is the firebox. This flue has a total of six feet which sit loosely on the edge of the firebox. Hinged wind guards in the form of plates are provided between these legs, which in their hinged down horizontal position can be used as serving boards.

This device is intended to be used both as a grill and as a fireplace, and to this end it could be set up at any desired place outdoors. This device may well be suited to serve as fireplace to create radiant heat for people sitting around it. As grill device, however, it is suitable to a very limited extent only, for the cooking grid is not vertically adjustable, because no heat-shield walls are present when the flue is removed, and lastly, because no possibility is provided to arrange a grill-skewer above the fire grate.

In the first-mentioned grill device, the ash box has no legs, and there is no possibility of affixing lateral wind guards on the ash box or on the firebox. No device for attaching a grill-skewer has been provided, either.

SUMMARY OF THE INVENTION

The invention provides a portable grill which is composed of a few convenient parts, separate in themselves, but easily joined together in various combinations into stable structures, which furthermore can easily be manufactured and which can be joined together in a stable manner without the aid of tools or screws, and with which, based on the various combination possibilities of the individual parts, there shall in each case be attainable the optimal operating properties, be it for grilling on the cooking grid, grilling on a skewer, cooking, roasting or cooking in pots, pans, or in a kettle.

The task is solved with a portable grilling device having the corners of the side walls of the firebox inward bent lug sheets, which with the corner sections of the side walls form connector lugs open at the top and bottom. The side walls are recessed in the bottom of the firebox, and of at least approximately rhombic section, into which, from the bottom side of the firebox, rhombic connecting pegs of the legs can be form fittingly inserted. Either connecting pets of wind guard walls or additional legs to form a girder-like kettle or grid-hanging device or a pot holder can be inserted from the top.

By this embodiment according to the invention, not only is high stability and steadiness achieved, but with simple and easy to handle means a high degree of variability is attained regarding the possibilities for erecting the grill device; all of which contribute greatly to that the grill device can be erected optimally for each respective type of use.

In one development of the legs, not only is a form-locking protection against torsion of the legs in the lugs of the firebox attained, but also an enlarged base is provided. Both contribute considerably to increasing the stability and steadiness of the device.

An advantageous possibility is obtained by attaching the legs to the bottom side of the firebox in such a manner that they do not project outwardly, but diagonally downwards towards the center of the firebox. Therefore the lower vertical sections of the legs can be inserted, for example, into appropriately arranged pinning holes or tubes of a concrete pedestal fixed firmly in the ground. This, too, assures very good stability. The use of the grill device is improved inasmuch as there are no legs laterally protruding towards outside, which could obstruct the approach to the firebox or be an impediment when rotating the firebox.

This embodiment is also advantageous when arranging a girder-like hanging device, because the bent foot segments, which in this type of application of the legs extend perpendicularly upwards, are better suitable for attaching a supporting plate or similar than are inclined leg-ends.

Through another embodiment of the grill device, not only is the advantage achieved that the wind-guard walls, when they are not needed, can be folded in a space-saving manner by virtue of their hinge-like connections or also loosely, but they can also be placed on the side walls of the firebox in a simple manner. This provides the possibility to create a ring-type wall, closed all around or partially opened, through the lateral opening of which the firebox and/or the cooking grid arranged above it become easily accessible, while the inside of the firebox can be protected to a large extent against an undesirable incidence of wind.

With another embodiment, the depth of insertion of the connecting pegs of both the legs and the wind-guard walls, and of pot holders as well, can be set in an easy manner. In addition, it is possible to realize a protection against torsion of round connecting pegs in the connector lugs, which is of interest especially when, for example, the pot-ring of a pot holder is provided with a table plate instead of a pot, and this table plate is to be attached firmly in a connector lug.

Through still another embodiment of the invention, an optimal thermal radiation of the braziers in the direction of products to be grilled is attainable, which latter are in this case preferably arranged on a skewer. As a result of the free arrangeability of the braziers, their distance from the products to be grilled can be adapted to the respective desired heat effects.

With the lid constructed in a trapezoidal form it is possible to close off the space surrounded by the wind-guard walls towards the top and thereby to reduce considerably the upward escape of heat. In this manner it is possible to attain not only a delay in the cooling off of the inner space, but also an increase of the temperature in the inner space, which is very advantageous for cooking or, at lower temperatures, for keeping food warm. In addition, this lid can also be used for covering the firebox when it is not in operation.

A further advantageous embodiment of the invention includes the fire-limiters, preferably present in triplicate which contribute not only to an economical consumption of charcoal, in that they keep the laid on charcoal together in the desired fire area and see to uniformly good combustion, but also in that the possibility obtains to place two sides of two such fire-limiters parallel to each other at a small distance from each other, so that they form a kind of crib in which an initially small quanity of charcoal is placed, which has a certain vertical distance from the bottom of the firebox. In this manner, the charcoal can easily be ignited, because a sufficient supply of oxygen is asured, especially from below and a certain fireplace effect is thereby attained.

In order to obtain an easily erected and easily handled vertically adjustale carrier device for the cooking grid above the firebox, the wall elements forming a fire limiter are made to a selected ratio of size.

Accordingly, it is an object of the invention to provide a portable grill device which comprises a hexagonal firebox having lug formations in each corner to facilitate the insertion of supporting legs from the bottom end thereof, or hanging braces from the top end and which has means for easily facilitating the mounting of a grill over the firebox as well as wind guard walls, supporting devices, etc.

A further object of the invention is to provide a portable grill which is simple in design, rugged in construction and eonomical to manufacture.

The various features of novelty which characterize the invention are pointed out with particularity in the claims annexed to and forming a part of this disclosure. For a better understanding of the invention, its operating advantages and specific object attained by its uses, reference is made to the accompanying drawings and descriptive matter in which preferred embodiments of the invention are illustrated.

BRIEF DESCRIPTION OF THE DRAWINGS

In the drawings:

FIG. 7 shows the firebox of FIG. 1 with an inserted grid and fourt wind guard walls on which a lid is arranged;

FIG. 8 shows a brazier as a separate component part, in perspective view;

FIG. 9 shows the hinge-like connection of two wind-guard walls, in sectional view;

FIG. 10 is a vertical section through a connection lug of the firebox with a leg inserted from below and a pot holder inserted from above;

FIG. 11 is a section taken along XI—XI of FIG. 10;

FIG. 12 shows a concrete pedestal with a connecting tube for a leg, in section;

FIG. 13 shows a leg, as separate component, in side view;

FIG. 14 is a section taken along XIV—XIV of FIG. 13 on an enlarged scale;

FIG. 15 shows three fire limiters arranged in hexagonal formation, in plan view;

FIG. 16 shows another arrangement of two fire limiters, in perspective plan view;

FIG. 17 is a section taken along XVII—XVII of FIG. 16.

DESCRIPTION OF THE PREFERRED EMBODIMENTS

Figure 1:
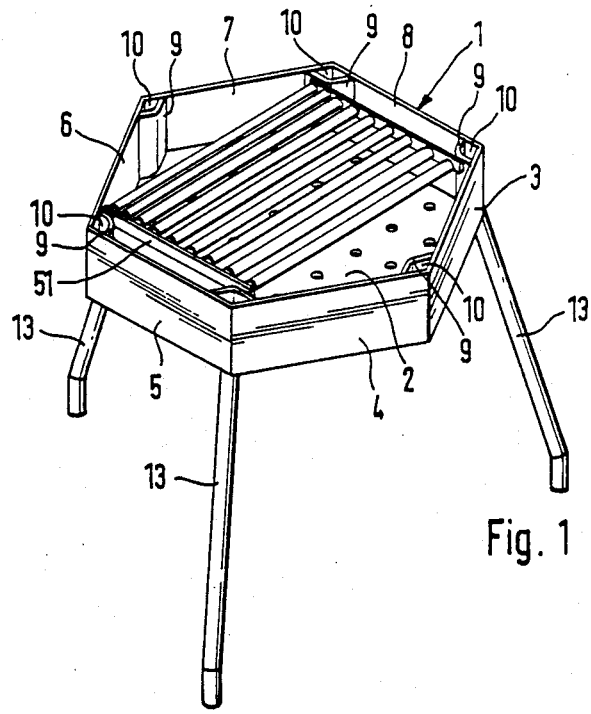
FIG. 1 is a perspective view of a firebox provided with legs and an inserted cooking grid, in perspective side view.

Referring to the drawings in particular, the invention embodied therein comprises a portable grill device, the basic parts of which are shown in FIG. 1 and various modifications and arrangements of these parts are shown in the remaining figures.

The grill device shown in the drawing has as basic component a hexagonal firebox 1 which is composed of a horizontal bottom 2 and of six vertical side walls 3,4,5,6,7 and 8 of even height, abutting in pairs at an angle of 120°. In the corners of the side walls 3 through 8 lug sheets 9 are welded on, each bent inwards, which extend over the entire height of the side walls 3 through 8 and which with the end sections of the side walls 3 through 8 form connector lugs or eyes 10, which are open at the top and at the bottom, the cross sections of which, as can best be seen in FIG. 11, exhibit an essentially rhombic form, whereby each of the corners situated on the diagonal 11 can be rounded off with the radius of the inside circle. It can also be gathered from FIG. 11 that the cross sectional form of the connector lugs or eyes 10 is symmetrical in relation to the diagonal 11 and that accordingly the longitudinal axis 12 of the rhombic cross sectional form runs at right angles to the diagonal 11. In the bottom 2, which can be provided with a discretionary number of ventilating holes 2', recesses are provided in each of the zones of connector lugs 10, which are not visible on the drawing, however.

In order to position the firebox 1 at a height suitable for operation, it is provided with three legs 13, each having the same form and which are fastened from below in the non-diametrically opposite connector lugs 10 of firebox 1.

As can be seen from FIGS. 13 and 14, these legs 13 are each composed of a straight tubular body 14 which at its upper end has an angular portion 15, bent at an acute angle of approximately 30°, with a connecting peg that has a rhombic cross sectional form as shown in FIG. 14 and matching the cross section of connector lug or eye 10 and that is thus form fittingly insertable from above or from below into any of connector lugs 10. Through the thereby created form-fitting connection it is ensured that the legs 13 cannot become twisted in the connector lugs 10. It is also possible, through careful manufacturing, to render this plug connection free from play, so that good steadiness and high stability can be obtained. At its lower end, the tubular body 14 has an angular base portion 17, bent by the same angle of approximately 30°, and running paraxially to the connecting peg 16. With the help of these base portions it is ensured that not only do the legs 13 sit with their bottom face level on the respective base support, but the possibility is also created for attaching the legs 13 to the firebox in the manner shown in FIG. 3, in which the slanted middle portions of legs 13 do not extend outwardly but downward towards the center and with the base portions 17 inserted into conduits 18 of a concrete pedestal 19. Here, too, an as slight as possible, radial freedom from play between the base portion 17 of leg 13 and the conduit 18 is of importance to obtain good steadiness and positional stability. This type of arrangement of the leg 13 has the advantage that the latter are not disturbed when one approaches the firebox and the risk of stumbling over them is not present, either.

Figure 2:
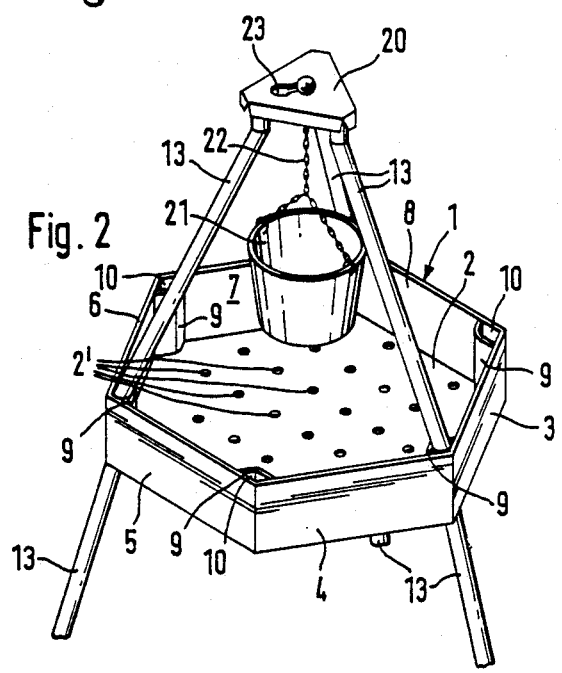
FIG. 2 shows the firebox of FIG. 1 provided with a girder-like hanging device, in perspective view.

As can be seen from FIG. 2, it is possible, in addition to the three legs 13 inserted from below into the connector lugs 10, to insert another three legs 13 in the connector lugs 10 from above in a quasi mirror inverted arrangement, in which case the connecting pegs 16 project downward and the base portions 17 upward. In this manner they form together with a joint plate 20 placed on the base portions 17 a girder-like hanging device for a kettle 21 which by means of a chain 22 can be fastened hanging and vertically adjustable in a slotted lug 23 of the joint plate. It is also possible to hang, for example, a hanging grid in this hanging device 13/20, instead of the kettle 21. As can already be seen from FIG. 2, this suspension device, which consists of three additional legs 13 and the covering plate 20, is very easily erected, in that the three legs are inserted in the connector lugs 10 in the manner described and are connected to the joint plate 20 that connects the upper ends. Disassembly of this suspension device is effected in a corresponding simple way.

Figure 3:
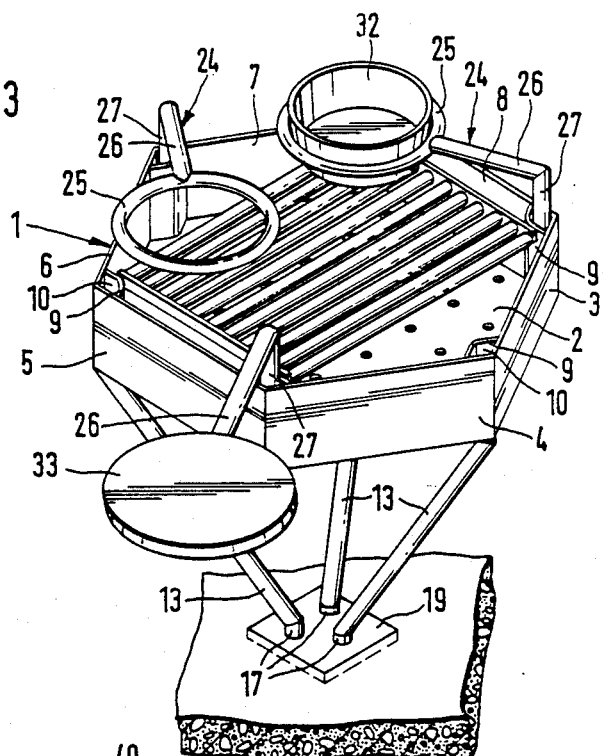
FIG. 3 shows the firebox of FIG. 1 with another leg arrangement and with several pot holders, in perspective side view.

As can be seen from FIGS. 3 and 10, the possibility also also exists of attaching pot-holders 24 in the connector lugs 10 that are open at the top. These pot holders 24 are each composed of a pot ring 25 attached to a horizontal bracket 26 which has a rectangularly bent connecting peg 27 that in the working position is vertical. The pot ring 25 and the bracket 26 with connecting peg 27 are appropriately composed of round material, e.g., of a round bar or of a tube, the diameter of which corresponds to the diameter of the inner circle of the rhombic cross-sectional profile of connector lug 10. In order to limit the insertion depth of such cylindrical connecting pegs 27 in the connector lug 10, on the one hand, and at the same time provide a possibility of fastening such connector pegs torsion tight in the connector lugs 10, the lug sheets 9 are provided, as can best be seen from FIGS. 10 and 11, in the area of half their height, with gated support pieces 28, inwardly pressed bead-like into the lug cross section, running parallel to the longitudinal axis 12 of the rhombic lug cross section. These support pieces 28 thusly form in relation to the inner circle of the rhombic lug cross section a chord-like, cross-section reducing contact surface 29 which can serve as a protection against torsion for a circular connecting peg when the latter has a corresponding flattening 30, as shown in FIGS. 10 and 11. This flattening 30 is appropriately arranged so that it lies diametrically opposite to the bracket 26. In this manner it is possible to fasten the pot holder or pot holders 24 torsion-tight in the diagonal position in the lugs 10, while when raised by the height of the flattening 30, seated with the bottom face 31 of connecting peg 27 on the support piece 28, they rotate as desired. Support piece 28 thus acts as other limiting means (in addition to the shoulder between portion 15 and peg 16) to limit the depth of penetration of a leg into an eye.

FIG. 10 shows further that instead of a pot 32, a round table plate 33 with a cylindrical attachment 33' can be inserted in the pot ring 25 of the pot holder 24. In place of pot ring 25, a cross or similar may also be provided.

Figure 4:
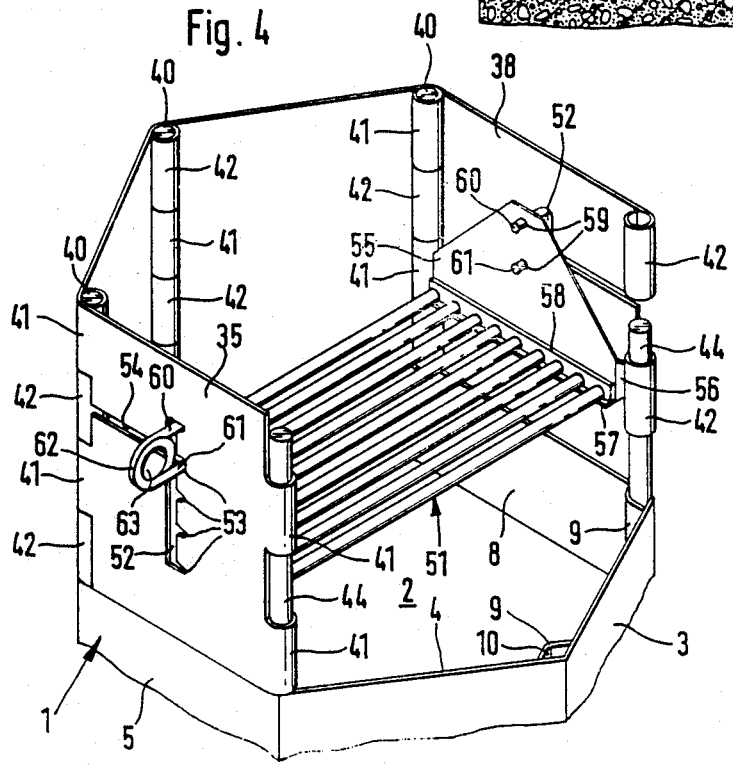
FIG. 4 shows the firebox of FIG. 1 with several wind guard walls and a vertically adjustable holding device for the cooking grid.
Figure 5:
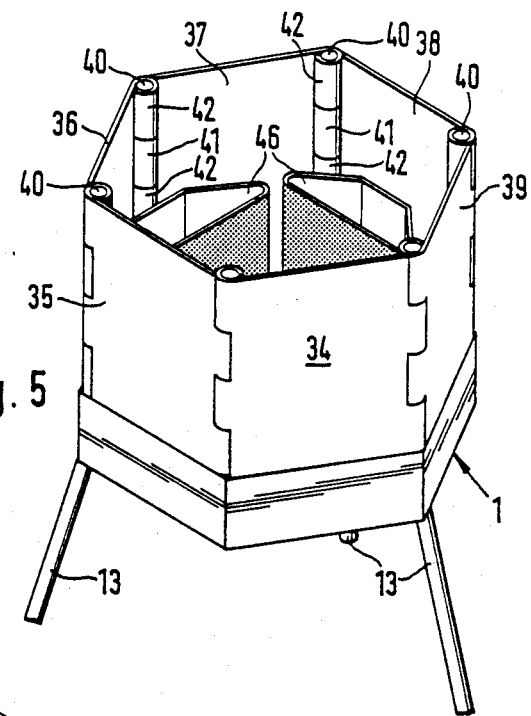
FIG. 5 shows the firebox of FIG. 1 with six wind guard walls making up a closed envelope and two braziers inserted upright into the firebox.
Figure 6:
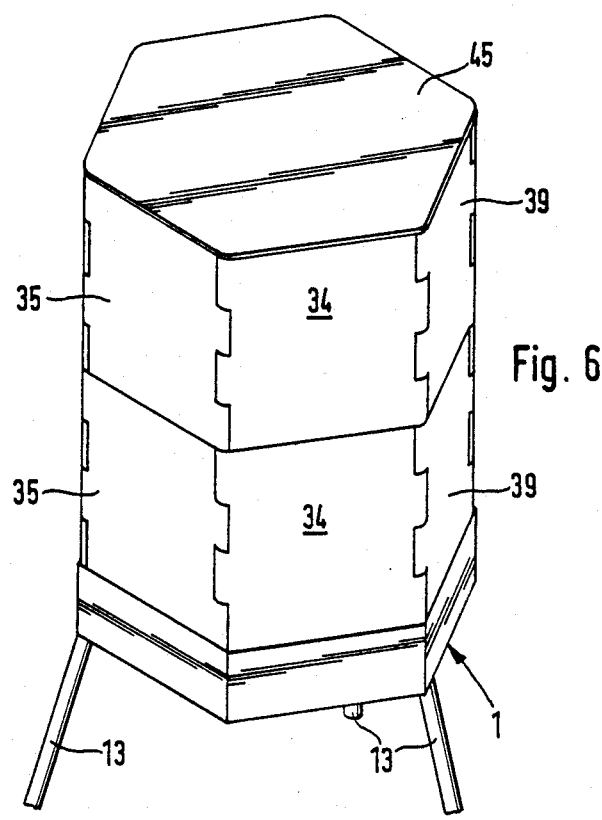
FIG. 6 shows the firebox of FIG. 1 with two wind guard wall envelopes placed one above the other, and a lid.

Wind guard walls 34, 35, 36, 37, 38 and 39 are provided to be placed on the side walls 3 through 8 of firebox 1; their lateral length corresponds each to the length of a side wall 4 through 8, and they are connected to one another in pair by at least partially separable hinges 40. These hinges 40 are each composed of interlocking annular lugs 41 and 42, respectively, in which, for the articulated connection of each two wind guard walls a hinge rod in the form of a tube 43 or a round bar 44 is inserted as coupling element, and the bottom end of which can be inserted as a connecting peg into one of the connector lugs 10 (See FIG. 9). In this manner, the individual wind guard walls 34 through 39 can simply be joined together and also be easily separated from each other, and/or individually or several jointly be placed on the side walls 3 through 8 of the firebox 1, in such a manner that they form e.g., according to FIGS. 4,5 and 7, a wind guard box closed on all sides, open at the top, or one open at the top and also at open above two side walls of firebox 1, or one closed at the top by means of a hexagonal lid 45, but laterally open above two sidewalls of the firebox. A further possibility is shown in FIG. 6. There, six wind guard walls each are placed on one another in a double arrangement and covered with a lid 45, so as to form a closed tower over the firebox 1, which can be used, for example, for hot smoking certain foods, e.g. sausage, meat or similar. The possibility is also provided to open and close one or two of the wind guard walls 34 through 39 like a door. In the arrangement shown in FIG. 4, which is open at the top but closed all around, the wind guard walls form a fireroom in which grilling on a skewer can excellently be done. In principle, the embers in the firebox could be used for this purpose. But better suited for grilling on a rotating driven spit are braziers 46, which, as can be gathered from FIGS. 5 and 8, have an essentially trapezoid cross-sectional form and in the vertical position can be placed on the bottom 2 of the firebox 1 in any desired arrangement. In these braziers, only the wall 47 arranged on the base side of the trapezoid cross-section is in the form of a perforated wall or a grating, while the other walls 48,49 and 50 are composed of sheet metal walls that are closed or have only very few openings. These braziers can randomly be moved around on the bottom of firebox 1, so that their heating effect on the products to be grilled can be regulated within limits. The bottoms of the braziers 46, not shown in the drawing, are appropriately arranged about 10 cm above the base.

For the vertically adjustable accommodation of a holding device for the cooking grid 51, the two opposite wind guard walls 35 and 38 (see FIG. 4) are each provided with vertical slots 52 which each have several lateral slotted lugs 53 arranged stepwise, in each of which ends a horizontal slot 54. The two horizontal slots 54 serve to introdue a grill rod which is longer than the distance between the two wind guard walls 35 and 38, and which is to be hung in each instance in one of the mounting lugs 53. The holding device for the cooking grid 51 consists of two completely equally shaped trapezoid sheet metal plates 55, arranged opposite each other in mirror inverted fashion on the inner surfaces of wind guard walls 35 and 38, which sheet metal plates have two lateral support fingers 56 and at the bottom edge an angular strip 57, on which the frame bar 58 of the cooking grid 51 rests loosely. In the upper middle range, the sheet metal plate 55 is provided with two connecting borings 59 the vertical distance between which corresponds to the vertical distances of the slotted lugs 53.

In these borings are inserted, under spring tension, the two spring legs 60 and 61 of an annular spring 62, the ring eye 63 of which is arranged seated outside the wind guard wall 35 respectively 38. The two spring legs 60 and 61 thus serve as carrier lugs for the sheet metal plates 55 which can be attached by means of the slotted lugs 53 at different heights above the bottom 2 of firebox 1 and/or above the products lying thereon.

An additional, very advantageous arrangement of the grill device according to the invention is shown in FIGS. 15 through 17. It concerns the fire limiters 64, 65 and 66, each of which have the same form and which can advantageousely be used in a three unit combination, as shown in FIG. 15, or also in pairs, as shown in FIGS. 16 and 17, for holding together in a heap the grill's charcoal and/or the products to be grilled. These fire limiters are each composed of two connected, oblong wall elements 67 and 68 which form an angle of, e.g., 120°, and both of which are inclined outwardly in relation to the vertical by an angle of approximately 30°. At the lower horizontal edges 72, 73 of these wall elements 67 and 68, bases 69, 70 and 71 are arranged, the height of which is at least 0.5 cm and which accordingly see to it that the lower edges 72 and 73, respectively, of wall elements 67 and 68 display a corresponding vertical distance from bottom 2 of the firebox 1, so that sufficient air can circulate through the thusly created slotted openings.

In FIG. 15, three fire limiters 64, 65 and 66 are arranged in a formation that corresponds to the hexagonal form of the brazier 6 and which, as a rule, is used when a large area fire is required. In FIGS. 16 and 17, on the other hand, the two longer wall elements 67 of only two fire limiters 63 and 64 are arranged at a lesser distance from each other and parallel to each other, so that between them they enclose a crib-like cavity 75, in which a small quantity of charcoal 74 can be placed without that it will fall to the bottom 2 of firebox 1. This arrangement of two fire limiters is eminently suited for igniting the charcoal 74 piled up in the crib-like cavity 75, in that, for example, a so-called igniter impregnated with an easily flammable liquid is placed under it and ignited. When the charcoal 74 is then sufficiently ignited, so that it can continue burning by itself, the two fire limiters can again be moved apart. Through the angular arrangement of the two joined together wall elements 67 and 68, and the arrangement of the bases 69, 70 and 71 at the ends of the lower edges 72 and 73, these fire limiters also possess sufficient stability so that the cooking grid 51 can be placed directly on them, such as is the case in FIG. 1.

It can be seen from FIGS. 15 and 16 that the wall elements 67 and 68 of the fire limiters 63, 64 and 65 are each of dissimilar length, because this results in more formation possibilities than with wall elements of equal length. In the illustrated exemplified embodiment, the wall elements 67 are on average 1.4 times longer than the wall elements 68.

While specific embodiments of the invention have been shown and described in detail to illustrate the application of the principles of the invention, it will be understood that the invention may be embodied otherwise without departing from such principles.

What is claimed is:

1. A portable grill device, comprising a firebox having six upright side walls which are connected to each other at adjacent corners disposed as angles to each other to form a hexagon, a bent lug sheet extending upwardly over substantially the same height as each side wall located in the vicinity of each corner and being being fixed to inner surfaces of the side walls at each corner, each lug sheet defining with a respective corner, a connector recess eye which is open at the top of said firebox, each connector eye having a rhombic cross-section, a plurality of legs for selective ones of said connector eyes, each leg having one end with a support leg portion and an opposite end with a connecting leg portion of substantially rhombic form for non-rotatable engagement in one of said connector eyes, each leg having a straight portion which is bent at an acute angle to said connecting peg portion, limiting means engaged between each leg and each connector eye for limiting the depth of penetration of each peg portion into each eye, and a plurality of support elements selectively engageable into the open top of ones of said connector eyes for supporting at least one of a wind guard wall, a grid and a potholder.

2. A portable grill according to claim 1, wherein there are at least three detachable legs and including a removable wind guard wall in said support elements engaged in the eyes from the tops thereof supporting said wind guard walls.

3. A portable grill according to claim 2, including a pot holder including a rod portion engageable in one eyes and an arm portion having a circular opening therein for a pot extending outwardly from the arm portion and being pivotable with said arm portion in the recess, and including a cooking grid and means for supporting said cooking grid in said wind guard wall.

4. A portable grill according to claim 2, wherein said legs also include angular base portions at the end thereof opposite to said connecting peg portions extending substantially parallel to said connecting peg portions.

5. A portable grill according to claim 1, including a plurality of wind guard walls each having a length equal to the length of the side walls of said firebox, said wind guard walls have end formations at each end thereof and including a hinge joint pivotably connecting said guard walls together, said hinge joint being long enough to engage into the recess eye of said firebox walls to support said wind guard walls above corresponding firebox walls.

6. A portable grill according to claim 5, wherein said hinge joints comprise spindle elements, said wind guards having hinge eyelets through which said spindle elements engage.

7. A portable grill according to claim 1, wherein each of said recess eyes has a gate support piece therein intermediate the height of said eye which runs parallel to the longitudinal axis of the eye.

8. A portable grill according to claim 7, including a plurality of pot holders each including a rectangularly bent round bar having a leg portion rotatably supported in the recess eye and have an outer end offset from the bar with means for suporting a pot thereon.

9. A portable grill according to claim 1, including braziers having a trapazoidal cross-section with a base side comprising a perforated metal sheet and with other side wall sections forming closed areas having only a few small openings, said braziers being of a size to be randomly placed in the firebox.

10. A portable grill according to claim 9, wherein two wall elements of said fire limiter are dissimilarly long in a ratio of approximately 1.2:1 up to 2:1.

11. A portable grill according to claim 1, including a plurality of wind guard walls, a rod member between each of said guard walls pivotably supporting one guard wall with the other, said guard walls extending entirely around the firebox and including a cover over the top of said guard walls so as to form a smoking chamber within said firebox.

12. A portable grill according to claim 1, including at least two substantially similarly shaped fire limiters arranged randomly in the firebox, each comprising two connected oblong wall elements with parallel longitudinal edges, said fire limiters forming an angle of from 90° to 120° with each other and both are being inclined outwardly in relation to the vertical by an angle of about from 20° to 30° and having outer ends in the vicinity of the common vortex which have bases at least 0.5 cm in height.

13. A portable grill according to claim 1, including a plurality of wind guard walls overlying each of the side walls and extending upright above said side walls and each being provided with a vertical slot having slotted lugs at graduated heights to hold horizontal cotter pins, and a cooking grid holder plate supported on said wind guard walls, said wind guard walls being provided with a horizontal slot ending in a vertical slot in which the cotter pins are engaged and which hold said cooking grid.

14. A portable grill according to claim 1, wherein said acute angle is approximately 30°.

15. A portable grill according to claim 1, wherein said limiting means comprises an angular portion connected to said straight portion at said acute angle, said connecting peg portion being connected to said angular portion, said angular portion defining a shoulder at said connecting peg portion for engagement against said firebox with said peg portion engaged into one of said eyes for limiting the depth of penetration of said peg portion in said one eye.

16. A portable grill device, comprising a firebox having a plurality of upright side walls connected to each other at adjacent corners and disposed at angles to each other to form a firebox space, having a bottom, and at least two substantially similarly spaced fire limiters arranged on the bottom of the firebox, each comprising two connected oblong wall elements with parallel longitudinal edges, said oblong elements being connected together to form an angle of from 90° to 120° with each other, said oblong walls being inclined outwardly in relation to the vertical by an angle of from 20° to 30°, said fire limiters being arranged so that one oblong wall element of each fire limiter faces each other with the oblong walls inclined away from each other in the vertical direction for confining charcoal therebetween on the firebox bottom, each of said fire limiters having depending spaced apart bases extending downwardly from a lower one of said parallel longitudinal edges of said wall elements and supporting said limiter wall elements above said firebox spaced bottom, so as to define a combustion air passage adjacent said firebox bottom.

* * * * *